（12） United States Patent
Gautier et al.

(10) Patent No.: US 7,913,835 B2
(45) Date of Patent: Mar. 29, 2011

(54) CONVEYOR ROLL AND PROCESS FOR ITS ASSEMBLY

(75) Inventors: David Gautier, Feignies (FR); Arnaud Flamme, Saint-Remy-du-Nord (FR)

(73) Assignee: Vesuvius Crucible Company, Wilmington, DE (US)

( * ) Notice: Subject to any disclaimer, the term of this patent is extended or adjusted under 35 U.S.C. 154(b) by 819 days.

(21) Appl. No.: 11/816,127

(22) PCT Filed: Feb. 21, 2006

(86) PCT No.: PCT/EP2006/001563
§ 371 (c)(1),
(2), (4) Date: Aug. 13, 2007

(87) PCT Pub. No.: WO2006/089716
PCT Pub. Date: Aug. 31, 2006

(65) Prior Publication Data
US 2010/0126823 A1 May 27, 2010

(30) Foreign Application Priority Data
Feb. 22, 2005 (EP) .................................. 05447040

(51) Int. Cl.
*B65G 13/02* (2006.01)

(52) U.S. Cl. ....................... 198/780; 193/35 R; 432/246

(58) Field of Classification Search .................. 198/780; 193/35 R; 492/42; 432/246; 65/181
See application file for complete search history.

(56) References Cited

U.S. PATENT DOCUMENTS

| 2,950,097 | A | * | 8/1960 | Tohir .............................. 432/246 |
| 3,061,386 | A | | 10/1962 | Dix et al. |
| 3,142,887 | A | * | 8/1964 | Hulck et al. ................ 29/898.06 |
| 3,867,748 | A | * | 2/1975 | Miller ........................... 432/246 |
| 4,242,782 | A | * | 1/1981 | Hanneken et al. ............ 432/246 |
| 4,404,011 | A | * | 9/1983 | McMaster ....................... 65/181 |
| 4,751,776 | A | * | 6/1988 | Reunamaki ..................... 492/47 |
| 4,925,014 | A | * | 5/1990 | Haite ............................. 198/780 |
| 5,146,675 | A | * | 9/1992 | Ford et al. .................... 65/370.1 |
| 5,316,129 | A | | 5/1994 | Dailey et al. |
| 5,370,596 | A | * | 12/1994 | Compagnon .................... 492/45 |
| 5,906,567 | A | * | 5/1999 | Gautier ........................... 492/16 |

* cited by examiner

*Primary Examiner* — James R Bidwell
(74) *Attorney, Agent, or Firm* — Thomas Clinton; Donald M. Satina

(57) ABSTRACT

Conveyor rolls used in high temperature applications, and an end cap assembly for such rolls. The conveyor roll comprises a ceramic spool, an end cap and a tolerance ring. The end cap contains a metal ferrule and has an internal circumference adapted to fit over an end of the ceramic spool. A tolerance ring is interposed between each end of the ceramic spool and the end cap. The tolerance ring is composed of resilient metal having a plurality of circumferentially arranged corrugations. The conveyor roll can resist temporary overheating or blockage without damage.

10 Claims, 2 Drawing Sheets

CONVEYOR ROLL AND PROCESS FOR ITS ASSEMBLY

FIELD OF THE INVENTION

The present invention relates to conveyor rolls used in high temperature applications, and more particularly concerns an improved end cap assembly for such rolls.

BACKGROUND OF THE INVENTION

A conveyor roll used in high temperature applications may comprise a ceramic spool having metal end caps. Typically, the ceramic spool comprises fused silica. The end caps permit facile mounting to a bearing or drive wheel. For example, in glass tempering applications, the ceramic spool supports glass sheet, and the end caps permit mechanical coupling to the drive mechanism. The end caps should securely adhere to the spool, thereby permitting the spool to rotate at the desired speed. Eccentric rotation is generally undesirable, as this would create an uneven support surface for the glass sheet.

The different thermal expansions of the ceramic spool and the metal end caps makes securely fastening the end caps to the spool difficult and can create eccentric rotations. Various methods have been proposed to overcome this difficulty. U.S. Pat. No. 3,867,748 teaches fastening end caps to a spool using an adhesive. U.S. Pat. No. 4,242,782 proposes fastening end caps using rubber O-rings. Adhesives and O-rings can become pliable and lose holding power at elevated temperatures causing eccentric rotation of the spool and slippage between the end caps and the spool. If, by accident, the adhesive and O-ring have been subjected to such elevated temperatures, they lose definitely their holding power so that even when the temperature returns to its normal value, slippage is still observed. For this reason, the fastening of end caps to a spool using adhesive or O-ring is limited to applications at low temperature (lower than 250° C.).

Metallic connectors have also been used to secure an end cap to a spool. U.S. Pat. No. 5,316,129 or U.S. Pat. No. 4,404,011 describes the use of a helically wound coil between the spool and the end cap. The coil includes bent portions and straight portions that permit continuous contact between the end cap and the spool despite disparate thermal expansion coefficients. The flat sided spring coil of this document consists in a succession of relatively long portions which are relatively thin. In these conditions, a significant flexibility of the coil elements is observed. Consequently, to obtain a torque sufficient to secure the end cap to the spool, it is necessary to pre-stress the coil very significantly. If the temperature increases accidentally (temporary overheat), the torque and consequently the fastening of the end cap to the spool are lost. Moreover, when the system cools down, the torque is not recovered. U.S. Pat. Nos. 5,906,567 and 5,370,596 describe curved bimetallic shims for securing the end cap to the spool. The curvature of the bimetallic shims changes with temperature thereby retaining a secure attachment between the spool and the end cap. Assembling and repairing a coil spring or bimetallic system can, however, be difficult. In addition, such metallic connectors are particularly adapted to specific temperature ranges (generally 400° C. and higher). Outside of this range, eccentric rotation can be observed.

Mechanical fasteners can be used to fasten an end cap to a spool. U.S. Pat. No. 4,751,776 shows an end cap having an annular distribution of screws that thread into a ferrule on the end of a spool. The screws are tightened to secure the end cap to the spool, but thermal expansion and contraction can loosen the screws causing eccentric rotation and slippage. In this case, the screws will seriously damage the surface of the spool. Screws have also been keyed to a flat surface machined on face of the spool so as to ensure coaxial rotation. Assembling and repairing such sleeve and locking key is time consuming. FR 2 550 172 describes an end cap including a metallic collar between the spool and the end cap. The end cap is locked in place with a key fitted to a flat surface of the spool. The collar has a thermal expansion greater than the end cap, and is intended to compensate for the difference in thermal expansion between the end cap and the spool. U.S. Pat. No. 5,146,675 discloses a screw that can be tightened to force a metal plate against a flat on the spool, which presses the spool against the inner surface of the end cap. The end cap includes an access opening that permits the screw, metal plate and end cap to be welded together, thereby preventing the screw from backing out. Effectively, the end cap and the spool connect across a single axis, that is, the screw. Thermal cycling across a single axis of contact can cause eccentric rotation and movement of the metal plate relative to the spool. Such movement can even cause the plate to contact the edge of the flat and crack the spool.

Another problem which is often observed with the conveyor rolls of the prior art is that of jamming. For example, in case the conveyed article is blocked or in case of mechanical seizing, the drive mechanism will continue to operate and will transmit a moment of torsion to the end cap. In these conditions, either the ceramic spool or the fastening means will break. The same consequences are observed on the long run when the conveyor roll is subjected to a brutal acceleration or deceleration.

A need persists for an end cap that fixedly and centrally secures to a ceramic spool within a wide range of application temperatures. The end cap should be able to resist a temporary overheat and to recover its holding power when the temperature is back to normal without causing eccentric rotation. The end cap should also be easy to install. The conveyor roll should also be able to resist temporary jamming or seizing of the line as well as to brutal acceleration or deceleration.

SUMMARY OF THE INVENTION

These objectives and others are fulfilled with a conveyor roll according to the present invention. Indeed, the tolerance ring interposed between the end cap and the end of the ceramic spool (also called roll neck) will fasten fixedly the spool in the end cap and ensure very efficient torque transfer and prevent eccentric rotation of the spool. In addition, in case of a temporary overheat, the end cap and the tolerance ring will thermally expand while the dimensions of the ceramic spool will not significantly change. Thereby, the fastening power of the tolerance ring will diminish and the spool will start slipping in the end cap. When the temperature will return back to normal, the end cap and tolerance ring will return to their "normal" dimensions and the holding power will be integrally recovered. It is important to note that during this temporary overheat, the spool will remain coaxial with the end cap thanks to the tolerance ring.

Tolerance rings are known from U.S. Pat. No. 3,061,386. They are described as made from resilient metal and have a plurality of circumferentially arranged corrugations of defined height and pitch, with both the height and pitch of the corrugations significantly lower than the diameter of the ring. Typically, the pitch is lower than 10% of the diameter and preferably lower than 8% of the diameter. Typically, the height is lower than 5% of the diameter and preferably lower than 3% of the diameter. U.S. Pat. No. 3,142,887 indicates a method of making such tolerance rings. This design is very particular and can be opposed to an helicoïdally wound flat sided coil. Due to this particular design, the tolerance ring shows very significant flexibility. Numerous variants of the tolerance rings have been described in the art (variable heights, pitches, multiple rows of corrugations aligned or offset, . . . ) and are sold by various companies. In principle all these kinds of tolerance rings can be used. It is preferable to have an open tolerance ring having a length lower than the internal circumference of the end cap since when the roll neck is introduced into the end cap provided with the tolerance ring, this must be able to accommodate the small dimensional variations that might occur during manufacturing of the spool or end cap. It might be advantageous to have a second open tolerance ring parallel to the first one but with their opening offset so as to improve the coaxiality of the spool in the end cap. It is also very advantageous to have a relatively limited pitch (less than 20 mm between two wave "highs") to obtain an increased rigidity.

It is preferred to have the corrugations oriented inwardly so that in case of slippage, this will occur only with respect to the "tolerance ring-end cap" couple and will not damage the surface of the spool.

According to an advantageous embodiment of the invention, at least one of the tolerance rings is provided with at least one tab while, in parallel, the corresponding end of the ceramic spool is provided with one or more notch(es) adapted to receive the tab(s) of the tolerance ring. Such an arrangement will prevent relative movement in one axial direction between the tolerance ring and the spool. Since it is preferable to prevent the withdrawal of the spool from the tolerance ring especially during a temporary overheat (i.e., when the pressure exerted on the spool by the tolerance ring is minimal), it is preferable to have the tab(s) oriented so that the end of the tab will cooperate with the wall of the notch the closest to the end of the spool. Thereby, the spool can only move slightly towards its end and abut the bottom of the end cap. If such tolerance rings provided with these advantageous tabs are provided on both sides of the spool, all relative movements of the spool are prevented.

According to another embodiment, the tolerance ring is provided with at least two tabs and one tab has an orientation opposite to at least another tab. Thereby, all relative movements of the spool with respect to a single tolerance ring are prevented.

As indicated above, the end cap has an inner circumference to receive a tolerance ring and one end of a spool. Advantageously, the end cap is provided with a step to limit relative movements between the tolerance ring and the end cap. According to a particularly preferred embodiment, the end cap is provided with a groove adapted to receive the tolerance ring. Thereby all axial movements of the tolerance ring with respect to the end cap are prevented even in case of a temporary overheat. It is especially advantageous to combine the presence of tabs on the tolerance ring with the groove in the end cap to avoid any relative movement of the spool with respect to the end cap during a temporary overheat.

According to a particular embodiment of the invention, both the end cap and the ceramic spool receive a mark once assembled together. Both marks are in register one to the other so that if a temporary overheat has occurred and the torque has ceased to be transmitted to the spool, the operator will notice this phenomenon, just by realising that the marks are offset. He could then take the appropriate measures.

The present invention also relates to a process for assembling a conveyor roll as described hereabove. This process comprises the steps of fitting a tolerance ring in the ferrule of an end cap and forcing each end of the ceramic spool into the end cap. The order of the steps is important otherwise, the position of the tolerance ring with respect to the spool can change during their insertion in the end cap. Generally, the end of the ceramic spool is forced in the end cap provided with the tolerance ring with a hydraulic press exerting a pressure of several hundreds kg/cm$^2$, for example 1000 kg/cm$^2$.

In case the tolerance ring is provided with one or more tab(s), the process comprises a further step of bending the(se) tab(s) inwardly and of aligning the spool so that the tab(s) match(es) the corresponding notch(es) of the spool.

The conveyor roll according to the invention can be used for conveying a foil or sheet (for example of glass or metal) for any kind of thermal treatment of the foil or sheet or of a coating applied thereon. This conveyor roll is particularly suitable for transporting flat articles in an environment subject to important temperature variations.

BRIEF DESCRIPTION OF THE DRAWINGS

In order to better explain the invention, a method of implementation given by way of a non-limitative example is described below with reference to the attached drawings in which.

DETAILED DESCRIPTION OF THE INVENTION

Figure 1:
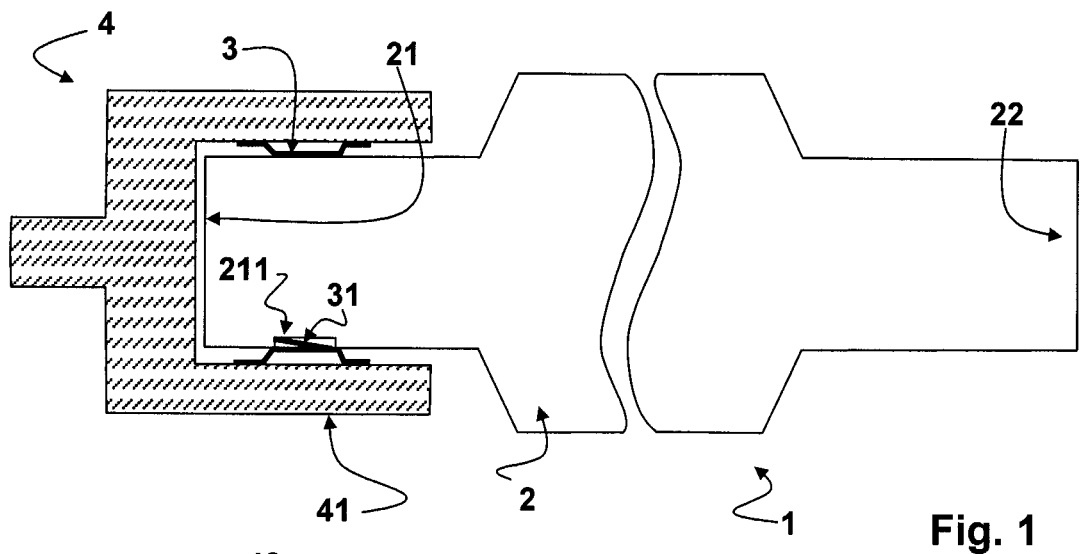
FIGS. 1, 2 and 3 are schematic section views of conveyor rolls according to an embodiment of the invention.

On these figures, 1 depicts generally a conveyor roll comprising a ceramic spool 2 having two ends 21 and 22. An end cap 4 comprising a ferrule 41 is arranged on both ends of the spool 2 (only the end cap provided at the end 21 is shown on FIG. 1). A tolerance ring 3 is inserted in the end cap 4. The end cap 4 has a regular inner surface on FIG. 1, while FIGS. 2 and 3 show respectively an end cap 4 provided with a step 42 or a groove 43 for restraining the movements of the tolerance ring 3 in the end cap.

The tolerance ring can be provided with a tab 31 cooperating with the wall of a notch 211 provided in the end of the ceramic spool 21. On FIGS. 1 to 3, the tab 31 cooperates with the wall of the notch the closest to end 21 of the spool 2.

Figure 2:
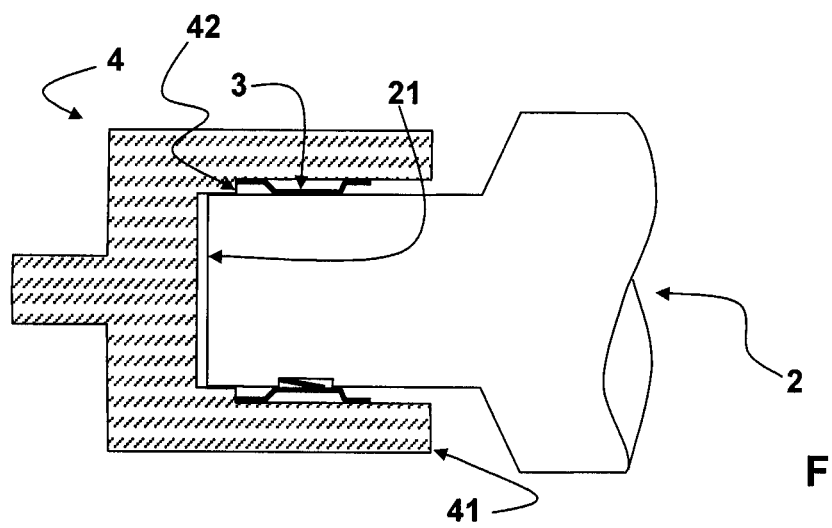
Figure 3:
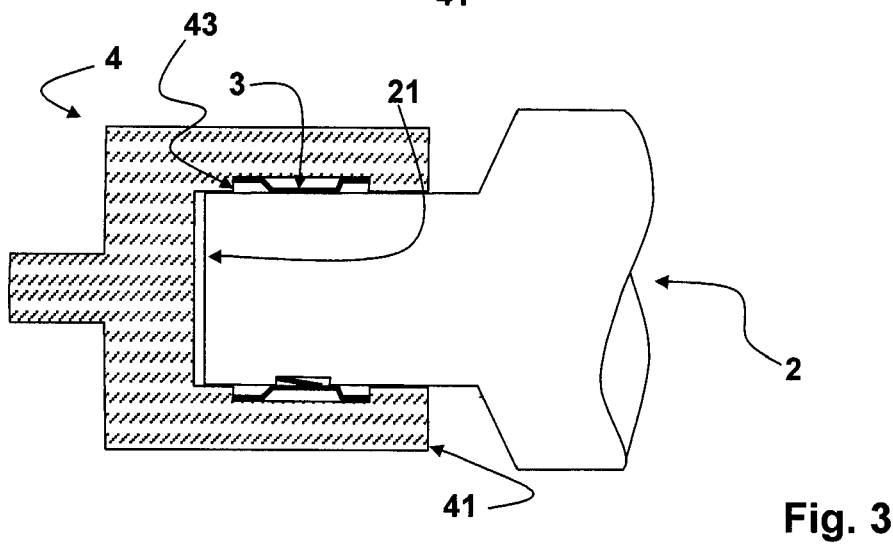

Trials have been performed with a conveyor roll according to FIG. 2 so as to demonstrate the possibility of the conveyor roll to resist a temporary overheat and to recover its normal operating conditions when the temperature returns back to normal.

An open tolerance ring 3 with inwardly oriented corrugations (length: 242 mm; width: 25 mm; height: 1.9 mm; pitch: 9.4; stainless steel) is inserted into an end cap 4 (carbon steel) having an internal diameter of 80 mm. The operation is repeated for the second end cap. Both ends of a spool 21 and 22 (diameter of 77 mm) are forced in the end caps 4. Such a conveyor roll is intended to work at temperatures comprised between room temperature and 200° C. The skilled person will easily find by routine experiments different arrangements (different metal operating at different temperatures).

Figure 4:
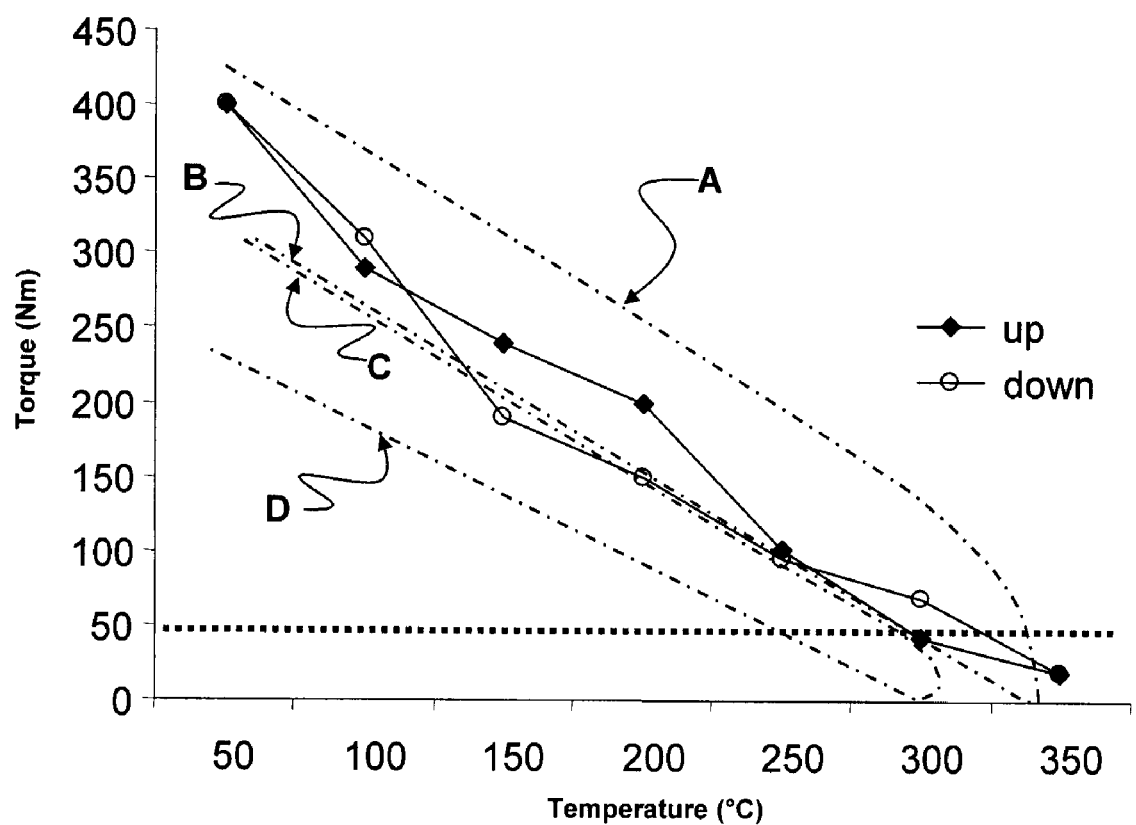
FIG. 4 shows a graph of the transmitted torque (Nm) vs. the temperature (° C.)

FIG. 4 shows the transmitted torque (Nm) vs. the temperature (° C.). It can be seen that the torque decreases progressively until about 300° C. where its value is of less than 50 Nm and the spool starts sliding. When the temperature returns back to normal (down curve), the transmitted torque increases rapidly to recover its original value. From 300° C., the spool stops sliding. After dismounting of the conveyor roll, it has been observed that both ends of the ceramic spool were in perfect condition and had not been damaged at all during the temporary overheat. FIG. 4 also shows (dotted lines) the transmitted torque (Nm) vs. the temperature (° C.) for a system as described in the U.S. Pat. No. 5,316,129. Such a system is constituted of relatively long and flat elements. When the system is subject to heat, the transmitted torque decreases progressively (curve A) until about 300° C. where the limit of elasticity of the system is reached. At that point, the transmitted torque drops dramatically and the roll starts sliding in the end cap. When the system returns back to normal (curve B), the system does not recover entirely the original torque since the elasticity limit of the system has been exceeded. When again subjected to temperature and cooled down (curves C and D), the same phenomenon is observed with the consequence that after only a few heating/cooling cycles, the torque is no longer transmitted so that the conveyor roll must be replaced. Such conveyor rolls are clearly not suitable for use in an environment suitable to significant temperature variations. On the opposite, the conveyor roll of the invention has proved to be fully satisfactory for such a demanding use.

The invention claimed is:

1. Conveyor roll for high temperature applications comprising:
   (a) a ceramic spool having ends and a radial surface;
   (b) at each end of the ceramic spool, an end cap comprising a metal ferrule and having a certain internal circumference adapted to fit over an end of the ceramic spool; and
   (c) interposed radially between each end of the ceramic spool and the end cap, an open tolerance ring of resilient metal comprising a smooth portion with a single radius, the tolerance ring having a curved dimension less than the internal circumference of the end cap and having a plurality of circumferentially arranged corrugations protruding in a single radial direction from the smooth, single radius portion.

2. Conveyor roll according to claim 1, wherein the tolerance ring has a pitch lower than 20 mm.

3. Conveyor roll according to claim 1, wherein the corrugations of the tolerance ring extend inwardly.

4. Conveyor roll according to claim 3, wherein a plurality of open tolerance rings are interposed between each end of the ceramic spool and the end cap, and the openings of the tolerance rings are offset.

5. Conveyor roll according to claim 1, wherein at least one of the tolerance rings is provided with at least one tab and in that the corresponding end of the ceramic spool is provided with at least one notch adapted to receive the at least one tab of the tolerance ring.

6. Conveyor roll according to claim 5, wherein the at least one tab is oriented so that the end of the tab will cooperate with the wall of the notch closest to the end of the spool.

7. Conveyor roll according to claim 6, wherein the tolerance ring is provided with at least two tabs and wherein at least one tab has an orientation opposite to at least another tab.

8. Conveyor roll according to claim 1, wherein the end cap is provided with a step or a groove adapted to receive the tolerance ring.

9. Process for the assembly of a conveyor roll according to claim 1, comprising the steps of
   (a) fitting an open tolerance ring having a curved dimension less than the internal circumference of the end cap in the ferrule of an end cap;
   (b) forcing each end of the ceramic spool into the end cap.

10. Process according to claim 9, comprising a further step a') of bending at least one tab of the tolerance ring inwardly and a step b') of aligning the spool so that the at least one tab matches the corresponding notches of the spool.

* * * * *